R. H. & O. S. ELDRIDGE.
Machine for Making Pins and Dowels.

No. 164,367. Patented June 15, 1875.

Witnesses.
Albert M. Moore.
Nathaniel Hill.

Inventors.
Randall H. Eldridge
Orrin S. Eldridge.

UNITED STATES PATENT OFFICE.

RANDALL H. ELDRIDGE AND ORIN S. ELDRIDGE, OF LOWELL, MASS.

IMPROVEMENT IN MACHINES FOR MAKING PINS AND DOWELS.

Specification forming part of Letters Patent No. 164,367, dated June 15, 1875; application filed January 19, 1874.

*To all whom it may concern:*

Be it known that we, RANDALL H. ELDRIDGE and ORIN S. ELDRIDGE, both of Lowell, in the county of Middlesex and Commonwealth of Massachusetts, have invented certain Improvements in Machines for Making Pins and Dowels, of which the following is a specification:

Our invention relates, mainly, to the combination of an automatically-sliding circular saw with certain revolving cutters, for the purpose of rounding, pointing, and cutting into desired lengths wooden pins or rods.

The accompanying drawings represent our invention.

Figure 2:
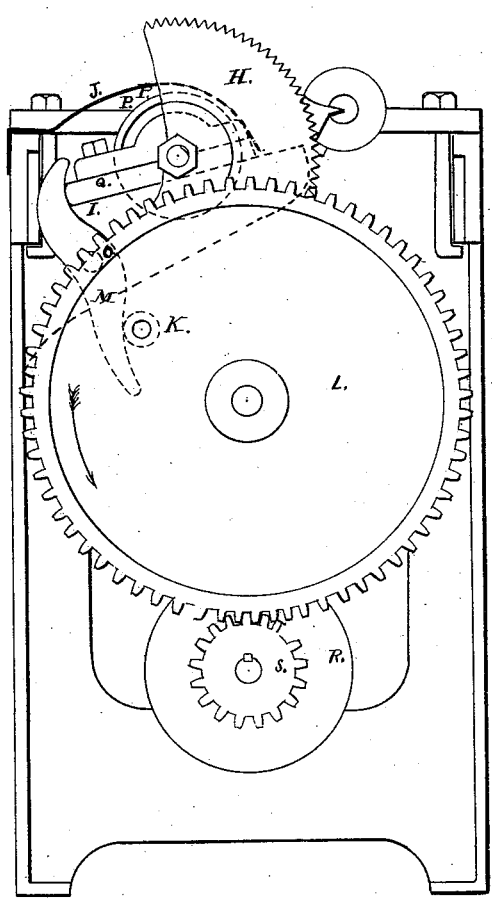
Figure 1:
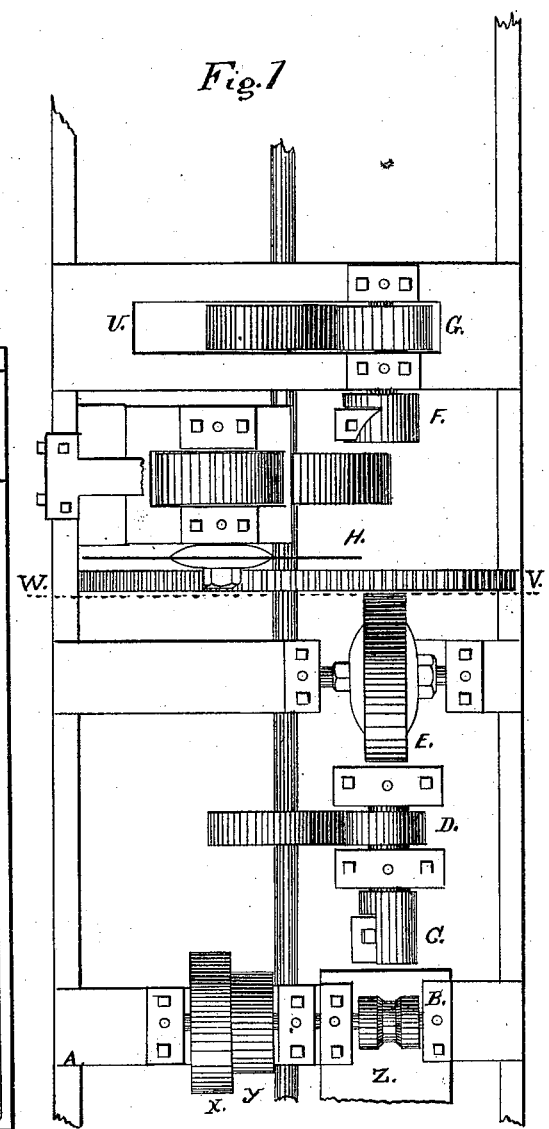

Figure 1 is a top view of our invention. Fig. 2 is a vertical cross-section on the line V W in Fig. 1.

A is the frame of a machine embodying our invention. B is a feed-roller revolving above the bed or stationary table Z. The roller B is grooved annularly, and the sides of the groove are roughened or toothed. The square rod from which the pins are made is fed between the roller B and the table Z, lying flat upon said table or bed, so that the rod enters the groove in said roller B in such a manner that when said rod is prevented from being carried forward by said feed-roller only the corners of the rod will be marred. The roller B is revolved by a belt passing over the pulley x y.

The speed of the roller may be varied by changing the belt from one part to the other of said pulley. The rod passes from the feed-roller through the revolving arbor, provided with a cutter, C, and is thereby rounded in the usual manner.

The cutter C is revolved by a belt over the pulley D. The rod then passes between two rubber rollers, the upper of which is shown, marked E. These rubber rollers are both alike, are not hard enough to mark or injure the surface of the rod now rounded, and are placed one immediately above the other. By these rubber rollers the end of the rod is pushed into the end of the revolving cutter F, which points the rod. The cutter F has a knife, which is set at an angle to the axis of the cutter—that is, the edge of the knife runs in toward the center of the cutter F—so that by pushing the rod into a hole in the front end of said cutter F the rod is pointed by the revolution of said cutter F. Just as the rod is properly pointed the saw H cuts off the pin, and it falls and the rod is again pointed as before. The cutter F is revolved by the pulley G in the same way that the cutter C is revolved. The circular saw H revolves in bearings which are supported upon a sliding carriage, Q, and said carriage is placed upon the inclined ways I. The carriage Q is pushed to the right (bringing the edge of the saw against the rod which is being worked) by the lever M. The lever M is pivoted at O, and its lower end is pushed to the left by the stud and roller K, which stud projects from the face of the gear L. After the stud K has passed the end of the lever the weight of the carriage Q, aided by the spring J, restores the lever to its former position. The gear L has a uniform motion, and is carried by the smaller gear S on the main shaft. The saw is revolved by a belt passing from the pulley R on the main shaft to the pulley P on the saw-arbor, and the ways I are straight and so inclined that the saw is farthest from the main shaft when said saw is at the top of said ways, so that the belt is loose when the saw is not cutting, which allows of a considerable saving of power.

The length to which the pins or dowels are cut depends on the nearness of the cutter F to the edge of the saw, and the cutter F is accordingly supported upon a frame which may be moved backward or forward upon the frame A, and the pulley U (to which the pulley G on said cutter F is belted) is made to slide upon a spline on the main shaft.

It will be seen the feed-roller above described is admirably adapted for the purpose for which it is intended, as, while it grasps the rod very firmly, it mars only the corners, which are subsequently taken off by the cutter C.

We claim as our invention—

1. The combination of the automatically-sliding circular saw H, the cutter C, and the cutter F, as and for the purpose herein described.

2. The combination of the feed-roller B, provided with the roughened annular groove herein described, with the revolving cutter C and the bed Z, as and for the purpose herein described.

RANDALL H. ELDRIDGE.
ORIN S. ELDRIDGE.

Witnesses:
ALBERT M. MOORE,
NATHANIEL HILL.